(12) United States Patent
Zhang et al.

(10) Patent No.: US 11,023,276 B2
(45) Date of Patent: Jun. 1, 2021

(54) METHOD AND APPARATUS FOR DATA PROCESSING

(71) Applicant: Dongfang Jingyuan Electron Limited, Beijing (CN)

(72) Inventors: Zhaoli Zhang, Beijing (CN); Weimin Ma, Beijing (CN); Naihong Tang, Beijing (CN)

(73) Assignee: Dongfang Jingyuan Electron Limited, Beijing (CN)

( * ) Notice: Subject to any disclaimer, the term of this patent is extended or adjusted under 35 U.S.C. 154(b) by 76 days.

(21) Appl. No.: 16/236,324

(22) Filed: Dec. 28, 2018

(65) Prior Publication Data

US 2019/0163525 A1 May 30, 2019

Related U.S. Application Data

(63) Continuation of application No. PCT/CN2017/075939, filed on Mar. 8, 2017.

(30) Foreign Application Priority Data

Dec. 30, 2016 (CN) .......................... 201611255889.3

(51) Int. Cl.
| | | |
|---|---|---|
| G06F 9/46 | (2006.01) | |
| G06F 9/48 | (2006.01) | |
| G06T 7/00 | (2017.01) | |
| G06T 1/20 | (2006.01) | |
| G06T 1/60 | (2006.01) | |
| G06F 9/50 | (2006.01) | |

(52) U.S. Cl.
CPC .......... G06F 9/4881 (2013.01); G06F 9/5038 (2013.01); G06T 1/20 (2013.01); G06T 1/60 (2013.01); G06T 7/0004 (2013.01); *G06T 2207/30148* (2013.01)

(58) Field of Classification Search
CPC ....... G06F 9/4881; G06F 9/5038; G06T 1/20; G06T 1/60; G06T 7/0004; G06T 2207/30148
USPC ....................................................... 718/102
See application file for complete search history.

(56) References Cited

U.S. PATENT DOCUMENTS

| | | | |
|---|---|---|---|
| 7,096,272 B1 * | 8/2006 | Raman ................... | H04L 45/00 709/231 |
| 7,379,847 B1 | 5/2008 | Blecher et al. | |
| 7,987,003 B2 * | 7/2011 | Hoffberg ................ | G05B 15/02 370/200 |

(Continued)

*Primary Examiner* — Ted T. Vo
(74) *Attorney, Agent, or Firm* — Young Basile Hanlon & MacFarlane, P.C.

(57) ABSTRACT

Methods and apparatuses are provided for data processing. The method includes receiving a data packet; associating codes with the data packet, wherein the codes specify processing to be performed to the data packet; and performing the processing to the data packet in accordance with the codes. The apparatus includes a receiver, configured to receive a data packet; a processor; and a memory coupled to the processor, the memory configured to store instructions which when executed by the processor become operational with the processor to: associate codes with the data packet, wherein the codes specify processing to be performed to the data packet; and perform the processing to the data packet in accordance with the codes.

19 Claims, 4 Drawing Sheets

(56) References Cited

U.S. PATENT DOCUMENTS

| | | | | |
|---|---|---|---|---|
| 8,891,852 B2* | 11/2014 | Eames | ............... | G06K 9/00624 |
| | | | | 382/141 |
| 9,612,273 B2* | 4/2017 | Pavani | ................... | G01R 31/26 |
| 2010/0177953 A1* | 7/2010 | Hayashi | ................. | G01B 11/08 |
| | | | | 382/145 |
| 2011/0069189 A1* | 3/2011 | Venkataraman | .......... | G06T 7/70 |
| | | | | 348/218.1 |
| 2014/0093157 A1* | 4/2014 | Mcgarry | ............... | G06T 7/0004 |
| | | | | 382/149 |

* cited by examiner

METHOD AND APPARATUS FOR DATA PROCESSING

CROSS-REFERENCE TO RELATED APPLICATION(S)

This application is a continuation of International Application No. PCT/CN2017/075939, filed on Mar. 8, 2017, which claims priority to Chinese Patent Application No. 201611255889.3, filed on Dec. 30, 2016, the contents of both of which are hereby incorporated by reference in their entireties.

TECHNICAL FIELD

The present disclosure relates to the field of computer data processing, and in particular, computer image detection and processing, and real time computer data processing.

BACKGROUND

In the field of data processing, particularly in the field of image data processing, data is often inputted into a data processing device in the form of data packets. In some fields, to determine the time and procedures of the processing, the processing of a data packet is not according to the order of data packets arriving at the data processing device, but to the correlation between the data packet and other specific data packets.

In application scenarios with demands of high speed, real time, large data volumes, and multi-node computing clusters, the above data processing approach presents many challenges: because of the correlation between data packets, the task management process can have complex timing logic to handle the complex timing relationship between data packets. A message-based communication mechanism between the task management process and the computing nodes can further complicate the management of such timing relationships. The task management process also needs to optimize allocation of computing nodes and computing tasks. Those challenges can all contribute to the overall inefficiency of a data processing system, or incur interlocking events that can result in system stagnation.

An existing solution is to use a task management process to coordinate these two different timings. In application scenarios with demands of high speed, real time, or large data volumes, it is complicated to design a good and optimum task management process. The best effect can be difficult to achieve in wide scopes of data volumes and number of computing nodes.

SUMMARY

Disclosed herein are implementations of methods, apparatuses, and systems for laser-assisted electron-beam inspection.

In an aspect, a method for data processing is disclosed. The method includes receiving a data packet; associating codes with the data packet, wherein the codes specify processing to be performed to the data packet; and performing the processing to the data packet in accordance with the codes.

In another aspect, an apparatus for data processing is disclosed. The apparatus includes a receiver, configured to receive a data packet; a processor; and a memory coupled to the processor. The memory configured to store instructions which when executed by the processor become operational with the processor to: associate codes with the data packet, wherein the codes specify processing to be performed to the data packet; and perform the processing to the data packet in accordance with the codes.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
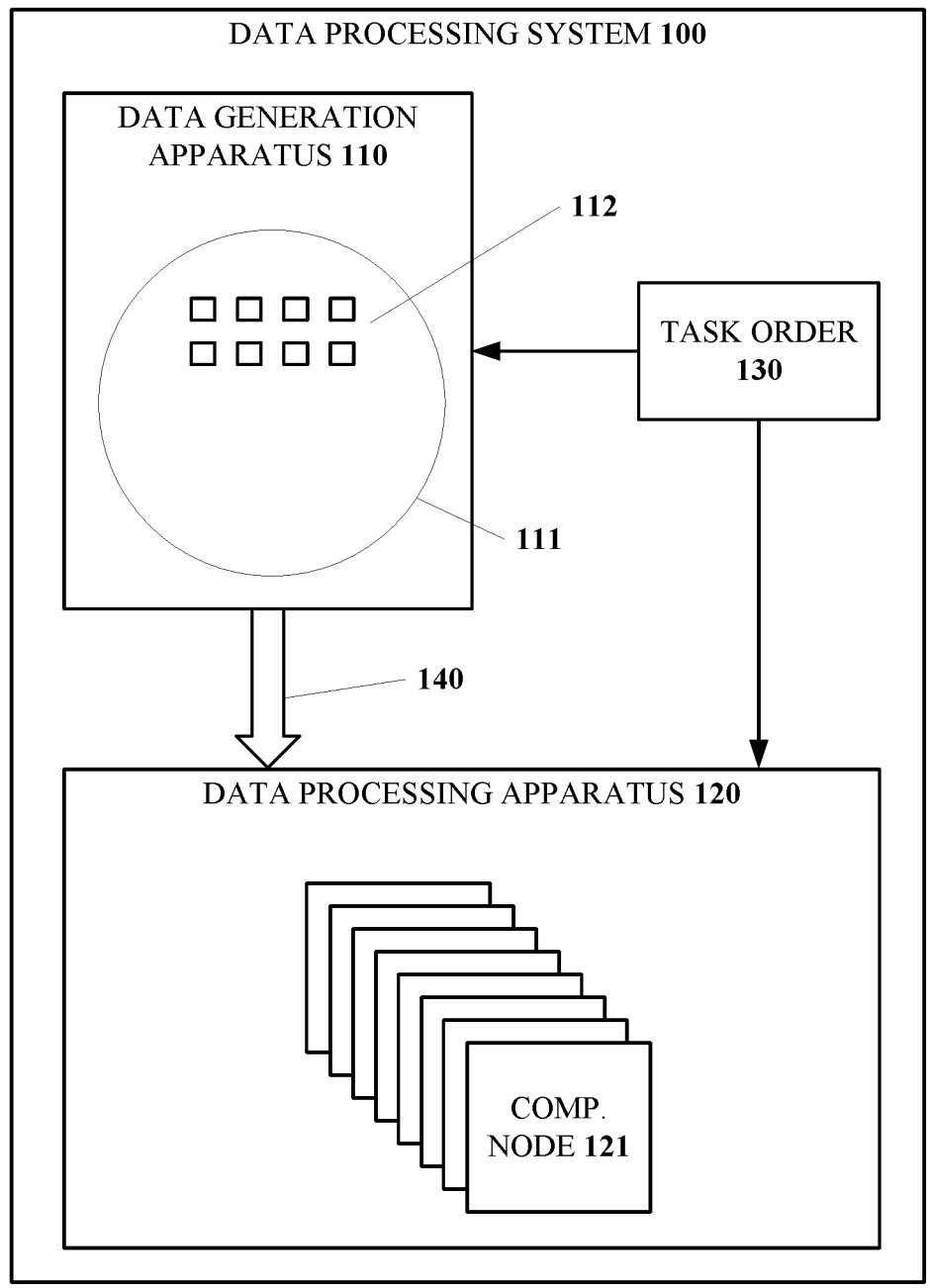
FIG. 1 is a diagram of a data processing system.

Implementations of this disclosure will be described in detail below. It should be noted that the implementation described herein is for illustrative purposes only and is not intended to limit the present disclosure. The following description sets forth numerous specific details to provide a thorough understanding of the present disclosure. However, it will be apparent to one of ordinary skill in the art that all of those specific details are not required to implement the present disclosure. In some implementations, to avoid obscuring the present disclosure, well-known circuits, materials, or methods are not specifically described.

Throughout the specification, reference to "embodiment," "implementation," "an example," or "examples" means that a feature, structure, or characteristic described in connection with the implementation or example can be included in another implementation of this disclosure. Therefore, the phrases "in an embodiment," "in an implementation", "an example" or "examples" appearing in various places throughout the specification do not necessarily refer to the same implementation or example. Furthermore, the features, structures, or characteristics can be combined in one or more implementations or examples in any suitable combination and/or sub-combination. In addition, it should be noted that the drawings are provided for the purpose of illustration and are not necessarily to scale. The term "and/or" used herein includes any and all combinations of one or more of the associated listed items. The disclosure is described below with reference to the accompanying drawings.

In some instances, data and program for processing the data can be separated. The data includes no program information, and how to process the data is dictated by the program. Specifically, the data can be generated by a data generating device specified by a task order. In a data processing apparatus, a task management process can be used to ensure that the data processing specified by the task order is faithfully executed. The task management process tracks two different timings (i.e., the data and the program) at all times. In scenarios of high speed, real time, and large data volume, it can be difficult to achieve high efficiency, stability, and free from interference of interlocking events. In the above instances, because of the difference between the timing of data generation and the timing of data processing, it can be very challenging to design and implement the task management process, and it can be difficult to extend it to larger-scale data processing applications.

According to implementations of this disclosure, the message management process based on message mechanism is abandoned and replaced by a new data processing mechanism based on "autonomous codes." Specifically, the data and the program information for processing the data are combined into data packets that include autonomous codes. Thus, the problems caused by two different timings can be avoided, and a more reliable task allocation process can be designed and optimized to make more efficient use of computing resources.

Therefore, by at least partially eliminated the complex timing logic in the task management, the probability of occurrence or errors and interlocks can be reduced, and the efficiency and robustness of the data processing apparatus can be increased. By reducing as much limitations as possible brought by the complicated timing relationships for the task allocation of data processing, the algorithms of data allocation can be better optimized, and the efficiency and reliability of the data processing apparatus can be increased.

FIG. 1 is a diagram of a data processing system. In the field of image-based defect detection with demands of high speed, real time, and large volume, the data processing system 100 includes a data generation apparatus 110 and a data processing apparatus 120. The data generation apparatus 110 can be, for example, a device that detects wafers using optical or electron beam scanning techniques, which typically has one or more optical or electronic sensors. A task order (or "task recipe") 130 specifies a detection algorithm and an area 112 in a workpiece 111 for detection for the data processing system 100.

Data packets (e.g., image data packets) can be generated by the optical or electron beam based data generation apparatus 110, and passed into the data processing apparatus 120 via a data link 140. The data processing apparatus 120 is typically a computer cluster system including multiple computing nodes 121.

According to the request of the task order 130, the data generation apparatus 110 can scan a specific area (or "region") on the workpiece 111, generate image data $I_a$, and send it to the data processing apparatus 120. The image data $I_a$ is to be compared with image data $I_b$ of another specific area (not shown) on the work piece 111 for defect detection. However, to ensure work efficiency, the data generation apparatus 110 does not guarantee sequentially generating the image data $I_a$ and the image data $I_b$. For example, $I_b$ can be scanned after the data generation apparatus 110 has scanned $I_a$ and multiple other images. The difference between image generation timing and image processing timing requires the data processing apparatus 120 to coordinate them.

Figure 2:
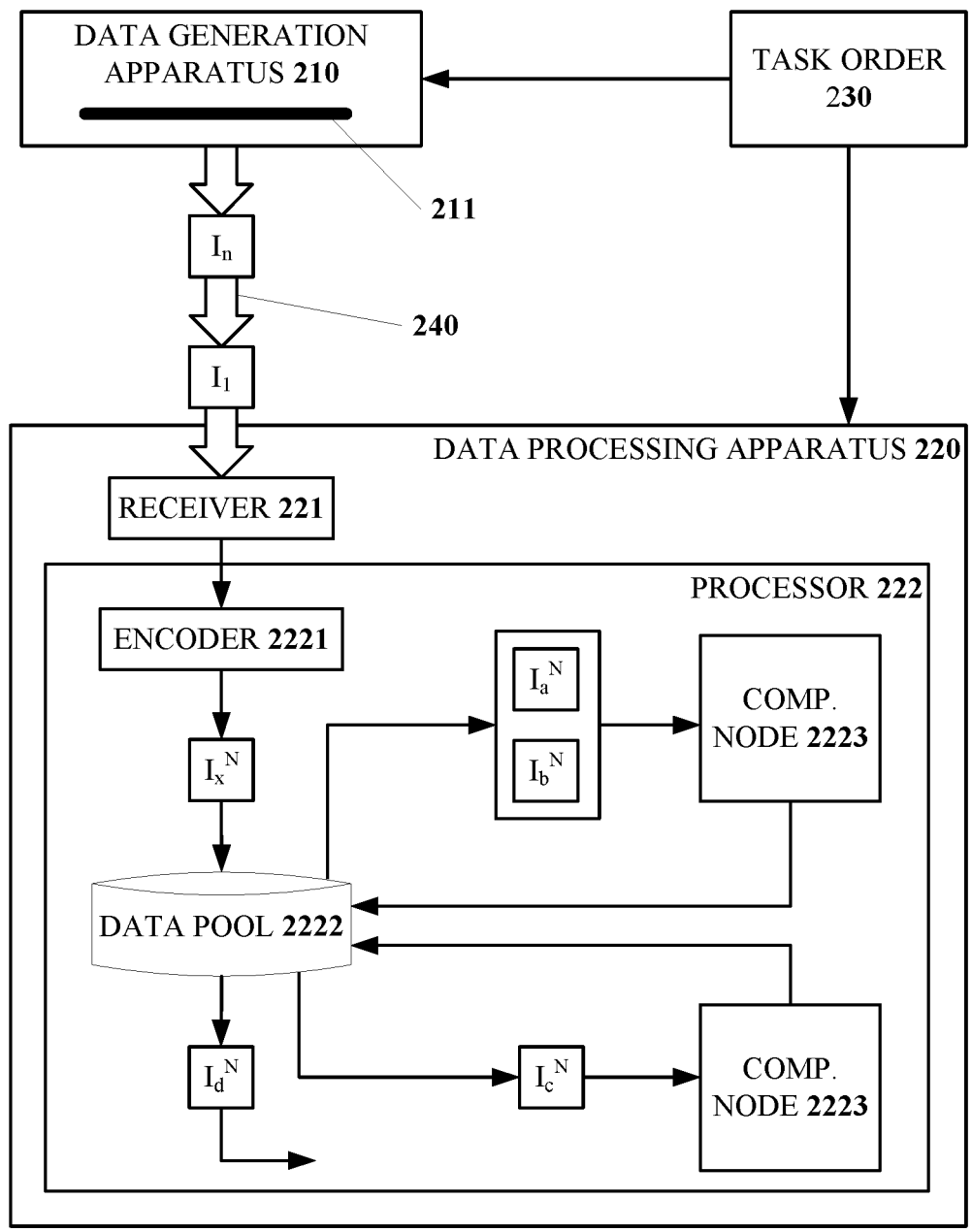
FIG. 2 is a diagram of an example data processing apparatus according to implementations of this disclosure.

Detailed implementations are described below with reference to the FIGS. 2-4 after an introduction of the data processing system. FIG. 2 is a diagram of an example data processing apparatus according to implementations of this disclosure. A data processing apparatus 220 can include a receiver (or "receiving unit") 221 and a processor 222.

The receiver 221 can include any number of any type of standard or special interface circuits, such as an Ethernet interface, a universal serial bus (USB) interface, and/or a peripheral component interconnect express (PCI-E) interface. The processor 222 can include one or more processors, such as Intel® microprocessors from Pentium® family, Itanium® family, or XScale® family. Other processors from other families can also be included. The processor 222 can be implemented in a centralized or distributed configuration, or deployed using other computing platform technologies, such as cloud computing technology.

The processor 222 can include an encoder 2221, a data pool 2222, and a computing node 2223. The data pool 2222 can be implemented as a volatile memory (e.g., a Synchronous Dynamic Random-Access Memory (SDRAM), a Dynamic Random-Access Memory (DRAM), a RAMBUS Dynamic Random-Access Memory (RDRAM), and/or any other type of random access memory) or a non-volatile memory (e.g., a flash disk, a disk file system, and/or any other type of storage device).

A task order 230 can be issued to a data generation apparatus 210 and a data processing apparatus 220. The task order 230 can specify an area to be detected (referred to as a "detection area") on a workpiece 211 and a detection algorithm. The task order 230 can also include data indicative of (referred to as "specify") correlations between different areas, such as between two or more areas to be compared for defect detection. The workpiece 211 described herein can be, for example, a silicon wafer, a substrate, or the like.

The data generation apparatus 210 can generate n data packets $I_1, \ldots, I_n$, (n≥2) according to the task order 230. The n data packets can be transmitted to the data processing apparatus 220 via a data link 240. For example, the data generation apparatus 210 can, according to the task order 230, capture an image of the detection area to obtain image data, and then obtain corresponding data packets.

The receiver 221 can receive the n data packets $I_1, \ldots, I_n$ transmitted to the data processing apparatus 220 via the data link 240. The data link 240 can use different protocols, such as Ethernet (e.g., Gigabit Ethernet), FireWire, high speed USB, or Small Computer System Interface (SCSI) (e.g., Fast Wide SCSI or Wide Ultra SCSI). When used in combination with other components of the data processing system, optical fibers can have a larger bandwidth than other components or protocols. In some implementations, optical fibers are used for the data link 240.

In some implementations, the encoder 2221 can assign a specific autonomous code or autonomous codes (represented as "N") to each of the data packets entering the data processing apparatus 220, according to the task order 230. The autonomous code N can be customized for a received data packet $i_x$ (not shown) according to the task order 230. The data packet $I_x$ can be combined (or "associated")) with the assigned autonomous code N to form a data packet $I_x^N$ that includes the autonomous code N.

The autonomous codes N for the data packet $I_x$ can include codes or instructions that specify which data packet or data packets $I_x$ is to interact with and which processing is to be completed in the data processing apparatus 220. That is, the autonomous code N specifies or describes generation, growth, interaction, changes, and extinction of $I_x$ in the data processing apparatus 200. The role of the autonomous codes can be analogized to the DNA of an organism.

In some implementations, some data packets can have correlations. For example, the data packets obtained from the areas to be compared with can have correlations between each other. Because such correlations are generated according to the task order 230, such correlations can be known to the data processing apparatus 220 that receives the task order 230. Such correlations can also be tagged or marked in the data packet. For example, the encoder 2221 can add a tag indicative of a match or correlation (referred to as a "matching tag" or a "correlation tag") between the data packets to be compared with, according to the task order

230. In addition, the encoder 2221 can mark the processing specified for each data packet in the task order 230 in a form of codes.

The data packet $I_x^N$ having the autonomous codes is sent to a data pool 2222 (Pool) for further processing. In some implementations, when a data packet $I_b^N$ that matches with (e.g., according to a matching tag in the autonomous codes) a data packet $I_a^N$ enters the data pool 2222, $I_a^N$ and $I_b^N$ be combined to form and execute a task (e.g., to process the data in $I_a^N$ and $I_b^N$, such as comparing their image data for defect detection) according to their respective autonomous codes. The task can be sent to a computing node 2223 for data processing. After the data is processed, the autonomous codes of the two data packets can be updated according to a processing result and sent back to the data pool 2222. The above process can be repeated until all the processing specified by the autonomous codes of the data packets $I_a^N$ and $I_b^N$ are completed.

In some implementations, if a data packet $I_c^N$ in the data pool 2222 need not to wait for another data packet for data processing, it can be directly sent to a computing node 2223 for processing. After the data is processed, the autonomous codes of the data packet can be updated according to a processing result and sent back to the data pool 2222. The above process can be repeated until all the processing specified by the autonomous codes of the data packet $I_c^N$ is completed.

When all processing specified by the autonomous codes are completed, a data packet (e.g., $I_d^N$) can be cleared out of the data pool 2222, and all work on the data packet by the data processing apparatus is completed.

Figure 3:
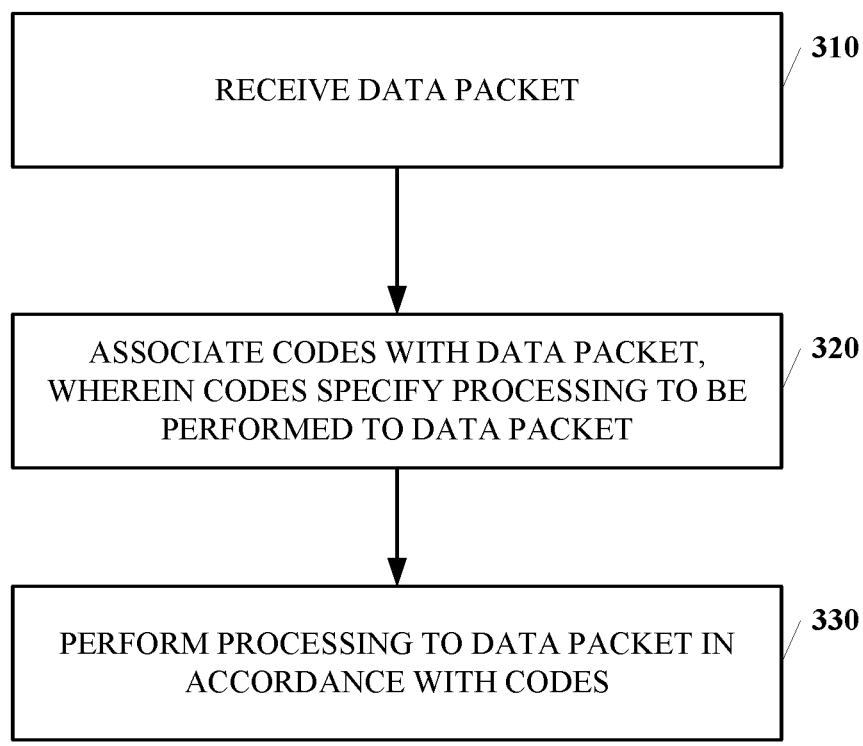
FIG. 3 is a flowchart of an example process for data processing according to implementations of this disclosure.

FIG. 3 is a flowchart of an example process for data processing according to implementations of this disclosure.

At operation 310, a data packet (e.g., the data packet $I_x$) is received. In some implementations, multiple data packets can be received. In some implementations, the data packet can be generated in accordance with a task order (e.g., the task order 230) by a data generation apparatus (e.g., the data generation apparatus 210).

At the operation 320, codes are associated with the data packet. The codes specify processing to be performed to the data packet. In some implementations, the codes can include the autonomous codes (e.g., the autonomous code N) as described above, which specify the processing to be performed to the data packet. For example, the codes can specify the processing that includes one or more procedures to be executed to the data packet and one or more related data packets associated with the one or more procedures. In some implementations, the codes associated with the data packet can be stored in a data pool (e.g., the data pool 2222 in FIG. 3).

At the operation 330, the processing is performed to the data packet in accordance with the codes. For example, the processing can be performed to the data packet in accordance with the procedure specified by the codes. When the codes specify the processing to be related to one or more other data packets, the processing can be held to not start until all the related data packets are received.

Figure 4:
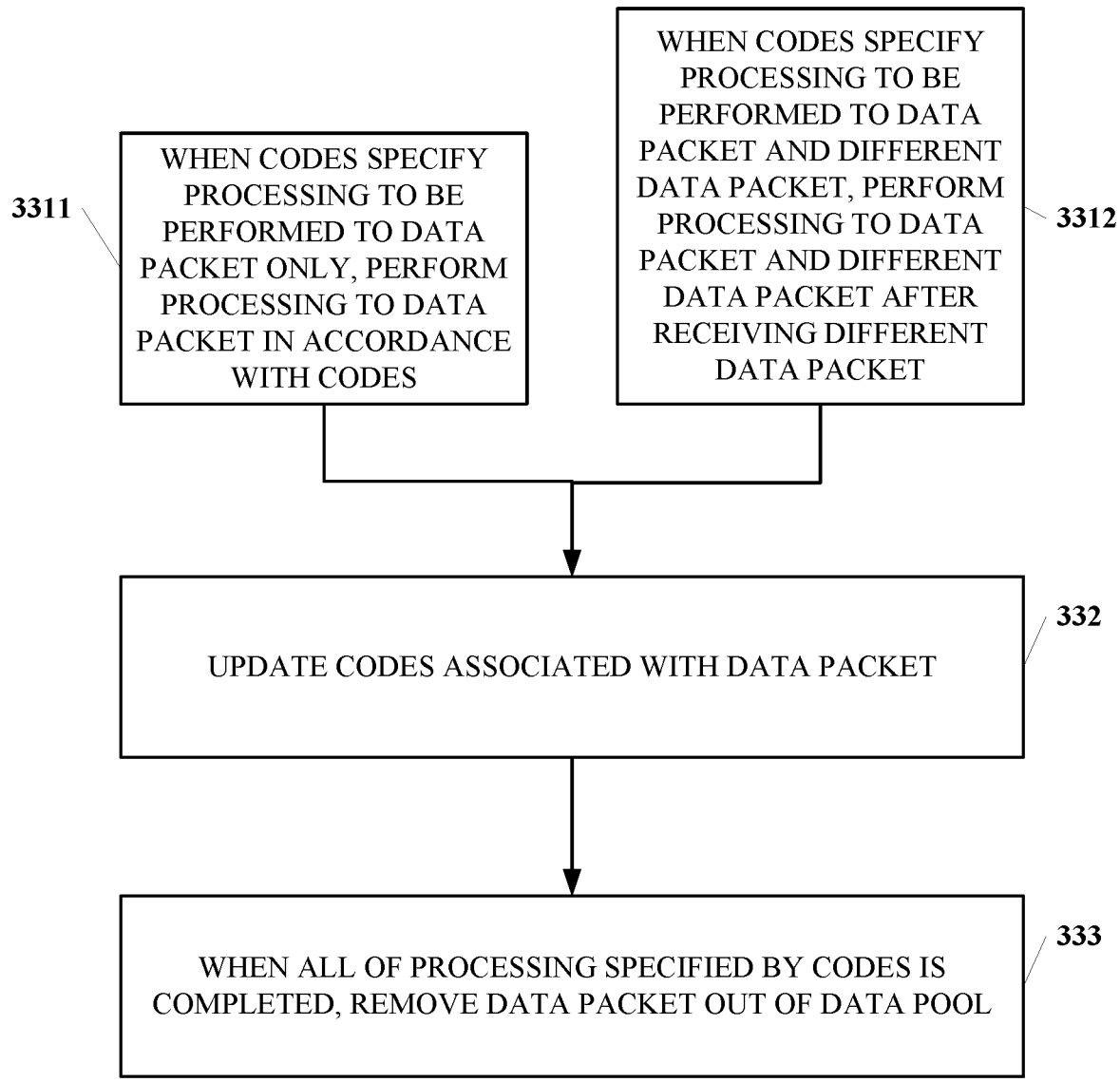
FIG. 4 is a flowchart of another example process for data processing according to implementations of this disclosure.

FIG. 4 is a flowchart of another example process for data processing according to implementations of this disclosure. FIG. 4 includes all the operations in FIG. 3. Therefore, for simplicity, those operations in FIG. 4 and also in FIG. 3 will not be described hereinafter.

As shown in FIG. 4, in an implementation, the operation 330 can include an operation 3311. At the operation 3311, if the codes associated with the data packet specify the processing to be performed to the data packet only, the processing can be directly performed to the data packet (e.g., without waiting for any other data packet to be received).

In another implementation, the operation 330 can include an operation 3312. At the operation 3312, if the codes associated with the data packet specify the processing to be performed to the data packet and one or more different data packets (e.g., a common processing or a comparison), the processing can be performed to the data packet and the different data packet after receiving the different data packet (e.g., by waiting before performing the processing).

In another implementation, after the operation 3311 or 3312 is performed (i.e., after completing the processing of the data packet associated with the corresponding autonomous codes), the operation 332 is performed. At the operation 332, the autonomous codes of the data packet associated with the corresponding autonomous codes are updated. The data packet with the updated autonomous codes can be sent back to a data pool (e.g. the data pool 2222).

At operation 333, data packets to be processed (e.g., data packets not having completed the processing specified by the codes) are stored in the data pool, and the data packets having completed all processing specified by the codes are cleared out of the data pool.

The above description is set forth in a number of implementations of data processing methods and apparatuses by using diagrams, flowcharts and/or examples. It should be understood by one having ordinary skill in the art that that each function and/or operation of such a diagram, flowchart or example can be implemented separately and/or in combination by any combination of various structures, hardware, software, or firmware. In an implementation, several aspects of the disclosure of the disclosure can be implemented through an application specific integrated circuit (ASIC), a field programmable gate array (FPGA), a digital signal processor (DSP), or other integrated format. However, It should be understood by one having ordinary skill in the art that some aspects of the implementations disclosed herein can be implemented in an integrated circuit as a whole or in part, such as one or more computer programs running on one or more computers (e.g., one or more programs running on one or more computer systems), one or more programs running on one or more processors (e.g., one or more programs running on one or more microprocessors), firmware, or substantially any combination of the above. In accordance with the present disclosure, those skilled in the art should be able to design circuits and/or write software and/or firmware code. Further, those skilled in the art should recognize that the mechanisms of the subject matter disclosed herein can be distributed as multiple forms of program products. Regardless of the particular type of signal-bearing media actually used for the distribution, any implementation of the subject matter of the present disclosure is applicable. Examples of signal-bearing media include, but are not limited to, recordable media, such as a floppy disk, a hard disk, a compact disk (CD), a digital versatile disk (DVD), a digital tape, a computer memory, or transmission type media, such as digital and/or analog communication media (e.g., a fiber optic cable, a waveguide, a wired communication link, a wireless communication link, etc.).

As used in this disclosure, the term "or" is intended to mean an inclusive "or" rather than an exclusive "or" for two or more elements it conjoins. That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. The term "and/or" used in this disclosure is intended to mean an "and" or an inclusive "or." That is, unless specified otherwise, or clear from context, "X includes A, B, and/or C" is intended to mean X can include any combinations of A, B, and C. In other words, if X includes A; X includes B; X includes C; X includes both A and B; X includes both B and C; X includes both A and C; or X includes all A, B, and C, then "X includes A and/or B" is satisfied under any of the foregoing instances. Similarly, "X includes at least one of A, B, and C" is intended to be used as an equivalent of "X includes A, B, and/or C." In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The use of "including" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed.

It should be understood that although this disclosure uses terms such as first, second, third, etc., the disclosure should not be limited to these terms. These terms are used only to distinguish similar types of information from each other. For example, without departing from the scope of this disclosure, a first information can also be referred to as a second information; and similarly, a second information can also be referred to as a first information. Depending on the context, the words "if" as used herein can be interpreted as "when," "while," or "in response to."

It should be noted that the above description is only examples and principle of the present disclosure. It should be understood that the present disclosure is not limited to the specific implementation herein. Those skilled in the art can make various obvious changes, adjustments, and substitutions without departing from the scope of protection of this disclosure. The scope of this disclosure is defined by the appended claims.

What is claimed is:

1. A method for defect detection, comprising:
generating, by an image scanning device, data packets according to a task order;
wherein the data packets comprise a first data packet and a second data packet,
wherein the task order indicates an order of generating the data packets and the task order indicates that the first data packet and the second data packet are to be compared for defect detection;
receiving, by a processor, the task order;
receiving, by the processor, the first data packet, wherein the first data packet comprises first image data;
associating, by the processor, first tags with the first data packet according to the task order;
receiving, by the processor, the second data packet, wherein the second data packet comprises second image data;
associating, by the processor, second tags with the second data packet according to the task order; and
comparing the first tags to the second tags to determine whether the first data packet and the second data packet are to be compared;
in response to the comparing indicating that the first data packet and the second data packet are to be compared according to the task order:
generating a combined data packet including the first data packet and the second data packet; and
performing a processing on the combined data packet in accordance with the first tags or the second tags by comparing the first image data and the second image data, wherein at least one of the first tags or the second tags specify the processing to be performed to the combined data packet.

2. The method of claim 1, further comprising:
storing at least one of the first data packet or the second data packet into a data pool prior to performing the processing to the combined data packet.

3. The method of claim 2, further comprising:
when all of the processing specified by the first tags is completed, removing the first data packet out of the data pool.

4. The method of claim 1, further comprising:
assigning third tags to a third data packet; and based on a determination that the third tags specify that some processing is to be performed to the third data packet by itself, performing the some processing to the third data packet in accordance with the third tags.

5. The method of claim 1, wherein the processing being a comparison of the first image data and the second image data.

6. The method of claim 1, wherein the processing comprises a procedure to be executed and a related data packet associated with the procedure.

7. The method of claim 1, further comprising:
updating the first tags associated with the first data packet after performing the processing to the combined data packet.

8. The method of claim 1, wherein the first data packet and the second data packet each comprises respective image data generated by capturing an image of a detection area of a wafer.

9. An apparatus for data processing, comprising:
a receiver, configured to receive a first data packet and a second data packet;
a processor; and
a memory coupled to the processor, the memory configured to store instructions which when executed by the processor become operational with the processor to:
associate first codes with the first data packet and second codes with the second data packet after receiving the first data packet and the second data packet, wherein the first codes and the second codes specify processing to be performed to a combined data packet, wherein the instructions do not include the first codes and the second codes;

generate the combined data packet comprising the first data packet and the second data packet in response to determining that the first data packet and the second data packet are correlated; and perform the processing to the combined data packet in accordance with the first codes or the second codes.

10. The apparatus of claim 9, wherein the apparatus further includes a data pool configured to store data, and the memory further comprises instructions which when executed by the processor become operational with the processor to:

store the combined data packet into the data pool.

11. The apparatus of claim 9, wherein the memory further comprises instructions which when executed by the processor become operational with the processor to:

associate third codes with a received third data packet; and based on a determination that the third codes specify that processing is to be performed third data packet only, perform the processing to the received third data packet in accordance with the third codes.

12. The apparatus of claim 9, wherein the processing is a matching or a correlating between the first data packet and the second data packet of the combined data packet.

13. The apparatus of claim 9, wherein the processing comprises a procedure to be executed and a related data packet associated with the procedure.

14. The apparatus of claim 9, wherein the memory further comprises instructions which when executed by the processor become operational with the processor to:

generate the first data packet by a data generating apparatus in accordance with a task order; and associate, in accordance with the task order, the first codes with the first data packet.

15. The apparatus of claim 9, wherein the memory further comprises instructions which when executed by the processor become operational with the processor to:

update the first codes associated with the first data packet after performing the processing to the combined data packet.

16. The apparatus of claim 15, wherein the memory further comprises instructions which when executed by the processor become operational with the processor to:

store the combined data packet into a data pool prior to performing the processing to the combined data packet; and when all of the processing specified by the first codes or the second codes is completed, remove the combined data packet out of the data pool.

17. A system for data processing, comprising:

a data generating apparatus, configured to generate a data packet in accordance with a task order;

a data link, configured to transmit the data packet from the data generating apparatus;

a data processing apparatus, comprising:

a receiver, configured to receive the data packet from the data link;

a processor;

a memory coupled to the processor, the memory configured to store instructions executable by the processor to:

associate codes with the received data packet in accordance with the task order, wherein the codes specify processing to be performed to the data packet;

a non-transitory storage device, configured to store the data packet associated with the codes; and a computing node, configured to:

receive the data packet; and perform the processing to the data packet in accordance with the codes.

18. The system of claim 17, wherein the data generating apparatus is further configured to:

generate the data packet by capturing an image of a detection area of a wafer, wherein the detection area is specified by the task order.

19. The system of claim 18, wherein the data link comprises an optical fiber.

\* \* \* \* \*